(12) United States Patent
Vasseur

(10) Patent No.: US 7,710,872 B2
(45) Date of Patent: May 4, 2010

(54) TECHNIQUE FOR ENABLING TRAFFIC ENGINEERING ON CE-CE PATHS ACROSS A PROVIDER NETWORK

(75) Inventor: Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 1175 days.

(21) Appl. No.: 11/302,595

(22) Filed: Dec. 14, 2005

(65) Prior Publication Data

US 2007/0133406 A1    Jun. 14, 2007

(51) Int. Cl.
*H04J 1/16* (2006.01)
(52) U.S. Cl. ....................... 370/230; 370/235
(58) Field of Classification Search .............. 370/230, 370/352, 392, 393.53, 351, 353, 235, 231, 370/237, 229, 389, 471, 218, 401, 395.52, 370/469, 535, 393; 709/221, 223, 230, 238, 709/243, 245
See application file for complete search history.

(56) References Cited

U.S. PATENT DOCUMENTS

| | | | |
|---|---|---|---|
| 6,339,595 B1 | 1/2002 | Rekhter et al. | |
| 6,463,061 B1 | 10/2002 | Rekhter et al. | |
| 6,526,056 B1 | 2/2003 | Rekhter et al. | |
| 6,553,423 B1 | 4/2003 | Chen | |
| 6,693,878 B1 | 2/2004 | Daruwalla et al. | |
| 6,856,991 B1 | 2/2005 | Srivastava | |
| 6,970,464 B2 | 11/2005 | Xu et al. | |
| 7,136,374 B1 * | 11/2006 | Kompella | 370/352 |
| 7,274,654 B2 * | 9/2007 | Yang et al. | 370/217 |
| 7,424,666 B2 * | 9/2008 | Chandwani et al. | 714/799 |
| 7,526,658 B1 * | 4/2009 | He et al. | 713/193 |
| 2005/0044262 A1 | 2/2005 | Luo | |
| 2005/0190757 A1 | 9/2005 | Sajassi | |

(Continued)

OTHER PUBLICATIONS

Tanenbaum, Andrew S., Section 1.4.2 The TCP/IP Reference Model, Computer Networks: Fourth Edition, pp. 41-44, Pearson Education, Inc., 2003.

(Continued)

*Primary Examiner*—Chi H Pham
*Assistant Examiner*—Alexander Boakye
(74) *Attorney, Agent, or Firm*—Cesari and McKenna, LLP

(57) ABSTRACT

A technique enables Traffic Engineering (TE) on paths between customer edge devices (CEs) across a provider network ("CE-CE paths") in a computer network. According to the novel technique, TE is configured on a link from a sending provider edge device (PE) to a first CE ("PE-CE link"), e.g., a CE of one or more virtual private networks (VPNs). The sending PE conveys TE information of the PE-CE link to one or more receiving PEs in the provider network. Upon receiving the TE information, each receiving PE expands a TE database (TED) for information regarding the provider network (i.e., a "core TED") to include TE-configured PE-CE links, e.g., by updating one or more corresponding VPN TEDs (VTEDs) for each VPN maintained by the receiving PE. Once the receiving PEs have the TE information for configured PE-CE links from the provider network, one or more TE techniques may be applied to paths from a second CE of the receiving PE to the first CE (a CE-CE path) to thereby facilitate, e.g., establishment of TE-LSPs along CE-CE paths.

23 Claims, 12 Drawing Sheets

U.S. PATENT DOCUMENTS

2005/0226245 A1  10/2005  Meda

OTHER PUBLICATIONS

Perlman, Radia, Interconnections Second Edition: Bridges, Routers, Switches, and Internetworking Protocols, Sections 12.1-12.3 pp. 299-324, Addison Wesley longman, Inc. 2000.

Y. Rekhter and T. Li, RFC 1771, entitled A Border Gateway Protocol 4 (BGP-4), pp. 1-48, Mar. 1995.

Awduche, D. et al., RFC 3209, entitled RSVP-TE: Extensions to RSVP for LSP Tunnels, pp. 1-47, Dec. 2001.

Smit, H., RFC 3784, entitled Intermediate System to Intermediate System (IS-IS) Extensions for Traffic Engineering (TE), pp. 1-13, Jun. 2004.

Katz, D. et al., RFC 3630, entitled Traffic Engineering (TE) Extensions to OSPF Version 2, pp. 1-14, Sep. 2003.

U.S. Appl. No. 10/767,574, entitled Computing Inter-Autonomous System MPLS Traffic Engineering LSP Paths, filed on Sep. 18, 2003, by Vasseur et al.

Braden, R. et al., RFC 2205, entitled Resource Reservation Protocol (RSVP)—Version 1 Functional Specification, pp. 1-105, Sep. 1997.

Ivan Pepelnjak and Jim Guichard, MPLS and VPN Architectures, Chapters 8-9 pp. 145-205, Cisco Press 2001.

Rosen, E. et al., RDC 2547, entitled BGP/MPLS VPNs, pp. 1-24, Mar. 1999.

BGP Link Bandwidth, Cisco Systems, Inc., pp. 1-16, Mar. 2005.

Berger L., RFC 3473, entitled Generalized Multi-Protocol Label Switching (GMPLS) Signaling Resource Reservation Protocol-Traffic Engineering (RSVP-TE) Extensions, pp. 1-40, Jan. 2003.

Bates, T et al., RFC 2283, entitled Multiprotocol Extensions for BGP-4, pp. 1-9, Feb. 1998.

Reynolds, J. and Postel, J., RFC 1700, entitled Assigned Numbers, pp. 1-215, Oct. 1994.

Vasseur, J.P. et al., Internet Draft, entitled Path Computation Element (PCE) Communication Protocol (PCEP), Version 1 (draft-vasseur-pce-pcep-02.txt), pp. 1-46, Sep. 2005.

Mannie, E., RFC 3945, entitled Generalized Multi-Protocol Label Switching (GMPLS) Architecture, pp. 1-65, Oct. 2004.

Mannie, E. et al., RFC 3946, entitled Generalized Multi-Protocol Label Switching (GMPLS) Extensions for Synchronous Optical Network (SONET) and Synchronous Digital Hierarchy (SDH) Control, pp. 1-25, Oct. 2004.

U.S. Appl. No. 10/983,327, entitled System and Method for Retrieving Computed Paths from a Path Computation Element Using a Path Key, filed on Nov. 5, 2004, by Vasseur et al.

U.S. Appl. No. 10/982,641, entitled System and Method for Retrieving Computed Paths from a Path Computation Element Using Encrypted Objects, filed on Nov. 5, 2004, by Vasseur et al.

* cited by examiner

VTED 600

| PE-CE LINK 605 | TE INFORMATION 610 |
|---|---|
| PE1 - CE1 | LINK TE INFORMATION |
| PE2 - CE1 | LINK TE INFORMATION |
| PE2 - CE2 | LINK TE INFORMATION |
| PE3 - CE3 | LINK TE INFORMATION |
| PE4 - CE3 | LINK TE INFORMATION |
| ⋮ | ⋮ |

ENTRIES 620

FIG. 6

TECHNIQUE FOR ENABLING TRAFFIC ENGINEERING ON CE-CE PATHS ACROSS A PROVIDER NETWORK

BACKGROUND OF THE INVENTION

1. Field of the Invention

The present invention relates to computer networks and more particularly to traffic engineering (TE) between customer edge devices (CEs) across a provider network in a computer network.

2. Background Information

A computer network is a geographically distributed collection of interconnected subnetworks, such as local area networks (LAN) that transport data between network nodes. As used herein, a network node is any device adapted to send and/or receive data in the computer network. Thus, in this context, "node" and "device" may be used interchangeably. The network topology is defined by an arrangement of network nodes that communicate with one another, typically through one or more intermediate nodes, such is as routers and switches. In addition to intra-network communications, data also may be exchanged between neighboring (i.e., adjacent) networks. To that end, "edge devices" located at the logical outer-bound of the computer network may be adapted to send and receive inter-network communications. Both inter-network and intra-network communications are typically effected by exchanging discrete packets of data according to predefined protocols. In this context, a protocol consists of a set of rules defining how network nodes interact with each other.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition*, by Andrew Tanenbaum, published 2003, which is hereby incorporated by reference as though fully set forth herein. A data packet may originate at a source node and subsequently "hop" from node to node along a logical data path until it reaches its addressed destination node. The network addresses defining the logical data path of a data flow are most often stored as Internet Protocol (IP) addresses in the packet's internetwork header.

A computer network may contain smaller groups of one or more subnetworks which may be managed as separate routing domains. As used herein, a routing domain is broadly construed as a collection of interconnected network nodes under a common administration. Often, a routing domain is managed by a single administrative entity, such as a company, an academic institution or a branch of government. Such a centrally-managed routing domain is sometimes referred to as an "autonomous system" or AS. In general, a routing domain may operate as an enterprise network, a service provider or any other type of network or subnetwork. Further, the routing domain may contain one or more edge devices having "peer" connections to edge devices in adjacent routing domains.

Network nodes within a routing domain are typically configured to forward data using predetermined paths from "interior gateway" routing protocols, such as conventional link-state protocols and distance-vector protocols. These interior gateway protocols (IGPs) define the manner with which routing information and network-topology information are exchanged and processed in the routing domain. The routing information exchanged (e.g., by IGP messages) typically includes destination address prefixes, i.e., the portions of destination addresses used by the routing protocol to render routing ("next hop") decisions. Examples of such destination addresses include IP version 4 (IPv4) and version 6 (IPv6) addresses. As such, each intermediate node receives a consistent "view" of the domain's topology. Examples of link-state and distance-vectors protocols known in the art, such as the Open Shortest Path First (OSPF) protocol and Routing Information Protocol (RIP), are described in Sections 12.1-12.3 of the reference book entitled *Interconnections, Second Edition*, by Radia Perlman, published January 2000, which is hereby incorporated by reference as though fully set forth herein.

The Border Gateway Protocol (BGP) is usually employed as an "external gateway" routing protocol for routing data between autonomous systems. BGP is well known and generally described in Request for Comments (RFC) 1771, entitled *A Border Gateway Protocol 4* (BGP-4), by Y. Rekhter et al., published March 1995, which is publicly available through the Internet Engineering Task Force (IETF) and is hereby incorporated by reference in its entirety. External (or exterior) BGP (eBGP) is often used to exchange routing information across routing domain boundaries. Internal BGP (iBGP) is a variation of the eBGP protocol and is often used to distribute inter-network reachability information (address prefixes) among BGP-enabled edge devices situated within the same routing domain. BGP generally operates over a reliable transport protocol, such as TCP, to establish a TCP connection/BGP session. BGP also may be extended for compatibility with services other than standard Internet connectivity. For instance, Multi-Protocol BGP (MP-BGP) supports various address family identifier (AFI) fields that permit BGP messages to transport multi-protocol information, such as is the case with RFC 2547 services, discussed below.

A network node within a routing domain may detect a change in the domain's topology. For example, the node may become unable to communicate with one of its neighboring nodes, e.g., due to a link failure between the nodes or the neighboring node failing, such as going "off line," etc. If the detected node or link failure occurred within the routing domain, the detecting node may advertise the intra-domain topology change to other nodes in the domain using IGP messages. Similarly, if an edge device detects a node or link failure that prevents communications with a neighboring routing domain, the edge device may disseminate the inter-domain topology change to other edge devices within its routing domain (e.g., using the iBGP protocol). In either case, propagation of the network-topology change occurs within the routing domain and nodes in the domain thus converge on a consistent view of the new network topology, i.e., without the failed node or link.

A virtual private network (VPN) is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN. When the pair of nodes is located in different routing domains, edge devices in a plurality of interconnected routing domains may have to cooperate to establish the nodes' virtual circuit.

A virtual circuit may be established using, for example, conventional layer-2 Frame Relay (FR) or Asynchronous Transfer Mode (ATM) networks. Alternatively, the virtual circuit may "tunnel" data between its logical end points using known layer-2 and/or layer-3 tunneling protocols, such as the Layer-2 Tunneling Protocol (L2TP) and the Generic Routing Encapsulation (GRE) protocol. In this case, one or more tunnel headers are prepended to a data packet to appropriately route the packet along the virtual circuit. The Multi-Protocol Label Switching (MPLS) protocol may be used as a tunneling mechanism for establishing layer-2 virtual circuits or layer-3 network-based VPNs through an IP network.

MPLS Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of their surrounding area(s), level(s), or AS. A PCC can be informed of a PCE either by pre-configuration by an administrator, or by a PCE Discovery (PCED) message ("advertisement"), which is sent from the PCE within its area or level or across the entire AS to advertise its services.

One difficulty that arises in crossing domain boundaries is that path computation at the head-end LSR requires knowledge of network topology and resources across the entire network between the head-end and the tail-end LSRs. Yet service providers typically do not share this information with each other across domain borders. In particular, network topology and resource information do not generally flow across area boundaries even though a single service provider may operate all the areas. Neither the head-end LSR nor any single PCE will generally have sufficient knowledge to compute a path where the LSR or PCE may not have the required knowledge should the destination not reside in a directly attached domain. Because of this, MPLS Traffic Engineering path computation techniques are required to compute inter-domain TE-LSPs.

In order to extend MPLS TE-LSPs across domain boundaries, the use of PCEs may be configured as a distributed system, where multiple PCEs collaborate to compute an end-to-end path (also referred to as "Multi-PCE path computation"). An example of such a distributed PCE architecture is described in commonly-owned co-pending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, the contents of which are hereby incorporated by reference in its entirety. In a distributed PCE architecture, the visibility needed to compute paths is extended between adjacent domains so that PCEs may cooperate to compute paths across multiple domains by exchanging virtual shortest path trees (VSPTs) while preserving confidentiality across domains (e.g., when applicable to ASes).

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

Layer-3 network-based VPN services that utilize MPLS technology are often deployed by network service providers for one or more customer sites. These networks are typically said to provide "MPLS/VPN" services. As used herein, a customer site is broadly defined as a routing domain containing at least one customer edge device (CE) coupled to a provider edge device (PE) in the service provider's network ("provider network"). The customer site may be multi-homed to the provider network, i.e., wherein one or more of the customer's CEs is coupled to a plurality of PEs, thus providing a redundant connection. The PEs and CEs are generally intermediate network nodes, such as routers or switches, located at the edges of their respective networks. PE-CE links may be established over various physical media, such as conventional wire links, optical links, wireless links, etc., and may communicate data formatted using various network communication protocols including ATM, Frame Relay, Ethernet, Fibre Distributed Data Interface (FDDI), etc. In addition, the PEs and CEs may be configured to exchange routing information over their respective PE-CE links in accordance with various interior and exterior gateway protocols, such as BGP, OSPF, IS-IS, RIP, etc.

In the traditional MPLS/VPN network architecture, each customer site may participate in one or more different VPNs. Most often, each customer site is associated with a single VPN, and hereinafter the illustrative embodiments will assume a one-to-one correspondence between customer sites and VPNs. For example, customer sites owned or managed by a common administrative entity, such as a corporate enterprise, may be statically assigned to the enterprise's VPN. As such, network nodes situated in the enterprise's various customer sites participate in the same VPN and are therefore permitted to securely communicate with one another via the provider network. In other words, the provider network establishes the necessary LSPs to interconnect the customer sites participating in the enterprise's VPN. Likewise, the provider network also may establish LSPs that interconnect customer sites participating in other VPNs. This widely-deployed MPLS/VPN architecture is generally described in more detail in Chapters 8-9 of the reference book entitled *MPLS and VPN Architecture, Volume* 1, by I. Pepelnjak et al., published 2001 and in the IETF publication RFC 2547, entitled *BGP/MPLS VPNs*, by E. Rosen et al., published March 1999, each of which is hereby incorporated by reference as though fully set forth herein.

One problem associated with MPLS/VPN networks is their current inability to distribute TE information regarding PE-CE links across the provider network to other PEs. Traffic Engineering (TE), generally, refers to utilizing TE information to engineer (compute, determine, detect, etc.) traffic, such as for computing paths, creating TE-LSPs (e.g., MPLS TE-LSPs), load-balancing traffic, etc., as will be understood by those skilled in the art. Examples of TE information, e.g., as described in above-referenced RFCs 3784 and 3630, comprise, inter alia, the dynamically measured IP bandwidth, reservable MPLS bandwidth, unreserved bandwidth, administrative group (color), TE metric, etc.

One solution for distributing static link bandwidth of PE-CE links (or, more generally, an AS exit link) has been described in the document entitled *BGP Link Bandwidth*, published by Cisco Systems, Inc., March 2005, which is hereby incorporated by reference as though fully set forth herein. Here, the static link bandwidth of the PE-CE link (i.e., the maximum link capacity) may be advertised to BGP neighbors (e.g., other PEs). However, this solution does not provide TE information of the PE-CE links, such as, e.g., the dynamically measured IP bandwidth, reserved MPLS bandwidth, color, etc. of the PE-CE links.

Another solution to distribute TE information of PE-CE links is to leak the information into the provider network (the "core"), such as through IGP messages. This solution suffers numerous problems, however, such as VPN private addressing constraints, i.e., where CEs of different VPNs may share the same address, which may cause route confusion at receiving devices. Also, a lack of scalability may exist considering the possible number of PE-CE links (e.g., hundreds of thousands), which may surpass the limitations of internal route leaking (e.g., of IGP messages), thus possibly causing fragmented messages, error messages, etc., as will be understood by those skilled in the art. This lack of scalability may also apply to attempts to manually configure TE information, which would be overly cumbersome given the dynamic nature of TE information.

As a result of the inability to efficiently distribute dynamic TE information, various TE techniques may not be applied to the PE-CE links from other PEs not attached to the PE-CE links. In particular, TE techniques may not be applied to paths from one CE to another CE across the provider network ("CE-CE paths"). For example, current MPLS/VPN networks do not have the ability to efficiently create TE tunnels (e.g., MPLS TE-LSPs) along CE-CE paths, such as for reserved bandwidth, fast convergence, fast re-route (FRR), diverse paths, etc. Service providers and customers often desire to have these and other TE techniques/benefits applied to PE-CE links and CE-CE paths in their provider/customer network (e.g., MPLS/VPN networks), such as for backup data centers, voice over IP (VoIP) traffic (e.g., C4 switches to carry legacy voice traffic), etc.

There remains a need, therefore, for a technique that expands the TE topology of a provider/customer network (e.g., an MPLS/VPN network) to include the TE information of PE-CE links, such that various TE techniques may be applied to the network. There also remains a need for a technique for creating TE-LSPs along CE-CE paths, and for applying PCE techniques to MPLS/VPNs, generally.

SUMMARY OF THE INVENTION

The present invention is directed to a technique for enabling Traffic Engineering (TE) on paths between customer edge devices (CEs) across a provider network ("CE-CE paths") in a computer network. According to the novel technique, TE is configured on a link from a sending provider edge device (PE) to a first CE ("PE-CE link"), e.g., a CE of one or more virtual private networks (VPNs). The sending PE conveys TE information of the PE-CE link to one or more receiving PEs in the provider network. Upon receiving the TE information, each receiving PE expands a TE database (TED) for information regarding the provider network (i.e., a "core TED") to include TE-configured PE-CE links, e.g., by updating one or more corresponding VPN TEDs (VTEDs) for each VPN maintained by the receiving PE. Once the receiving PEs have the TE information for configured PE-CE links from the provider network, one or more TE techniques may be applied to paths from a second CE of the receiving PE to the first CE (a CE-CE path) to thereby facilitate, e.g., establishment of TE-LSPs along CE-CE paths.

In accordance with one aspect of the present invention, the sending PE conveys TE information of its TE-configured PE-CE links through a "TE advertisement." In the illustrative embodiment described herein, Border Gateway Protocol (BGP) messages are used to convey the TE advertisement, in particular, Multi-Protocol (MP)-BGP messages. Illustratively, a new MP-BGP AFI/SAFI ("address family identifier/subsequent address family identifier") may be created for CEs connected to the sending PE via a TE-configured PE-CE link. Within a network layer reachability information (NLRI) field of the MP-BGP message, for example, various sub-fields may be used to convey the desired TE information. For instance, the information may comprise, inter alia, an address of the CE (e.g., in a VPN context), an address of the sending PE, a route target (RT), and one or more TE-based PE-CE link attribute information fields, such as, e.g., color, bandwidth, etc. The MP-BGP message (TE advertisement) may then be transmitted to the receiving PEs accordingly.

In accordance with another aspect of the present invention, the PEs establish a VTED for each VPN of interest, e.g., for each VPN to which the PE is connected should there be at least one local TE-enabled link for that VPN. Upon receipt of PE-CE link TE information (e.g., from the BGP message), the receiving PE populates its one or more VTEDs with the corresponding information. For instance, information for a PE-CE link of a particular VPN may be inserted into a VTED corresponding to that VPN. Each VTED may point to (reference) the core TED for the internal links of the provider network. By combining information from the VTEDs with the core TED, a substantially complete topology of TE-configured PE-CE links of the provider network may be available to the PEs.

In accordance with yet another aspect of the present invention, the substantially complete topology of TE-configured PE-CE links may be used for a variety of TE techniques for CE-CE paths across the provider network. For example, a first TE technique may establish Multi-Protocol Label Switching (MPLS) TE label switched paths (LSPs) along CE-CE paths across the provider network. According to the first technique, a CE wishing to create a TE-LSP sends a path request to an attached PE (e.g., randomly selected), which, using the TE topology, determines the best TE-based route for the path from itself, and attempts to signal the path accordingly. If the path signaling fails, an error is returned to the CE, which may attempt to employ a different PE device, if available.

A second example TE technique may also establish MPLS TE-LSPs along CE-CE paths, but instead uses a path computation element (PCE). The PCE (e.g., a PE configured as a PCE) may have a more complete TE topology (e.g., not simply from its own view), and may be used to determine the best CE-CE path from any attached ingress PE, to compute diverse paths, to locate lesser constrained paths, etc. For instance, a CE sends a path computation request to a PCE, which computes the best CE-CE path from any attached PE using the TE topology, and informs the CE of the path (e.g., loose hops, encrypted routes, etc.) so it can begin signaling the TE-LSP. Notably, extensions to signaling messages for the TE-LSPs may be utilized to protect and/or interpret private source and destination addresses.

Advantageously, the novel technique enables TE on CE-CE paths in a computer network. By conveying TE information for PE-CE links, the novel technique allows PEs of the provider network to expand their TE topologies to include the PE-CE links. Accordingly, by including TE information for PE-CE links, the novel technique allows for TE techniques to be applied to CE-CE paths. Particularly, MPLS TE-LSPs may be efficiently created along CE-CE paths. Also, the dynamic nature of the novel technique alleviates the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 6 is a schematic block diagram of an exemplary VTED that may be used in accordance with the present invention;

DETAILED DESCRIPTION OF AN ILLUSTRATIVE EMBODIMENT

Figure 1:
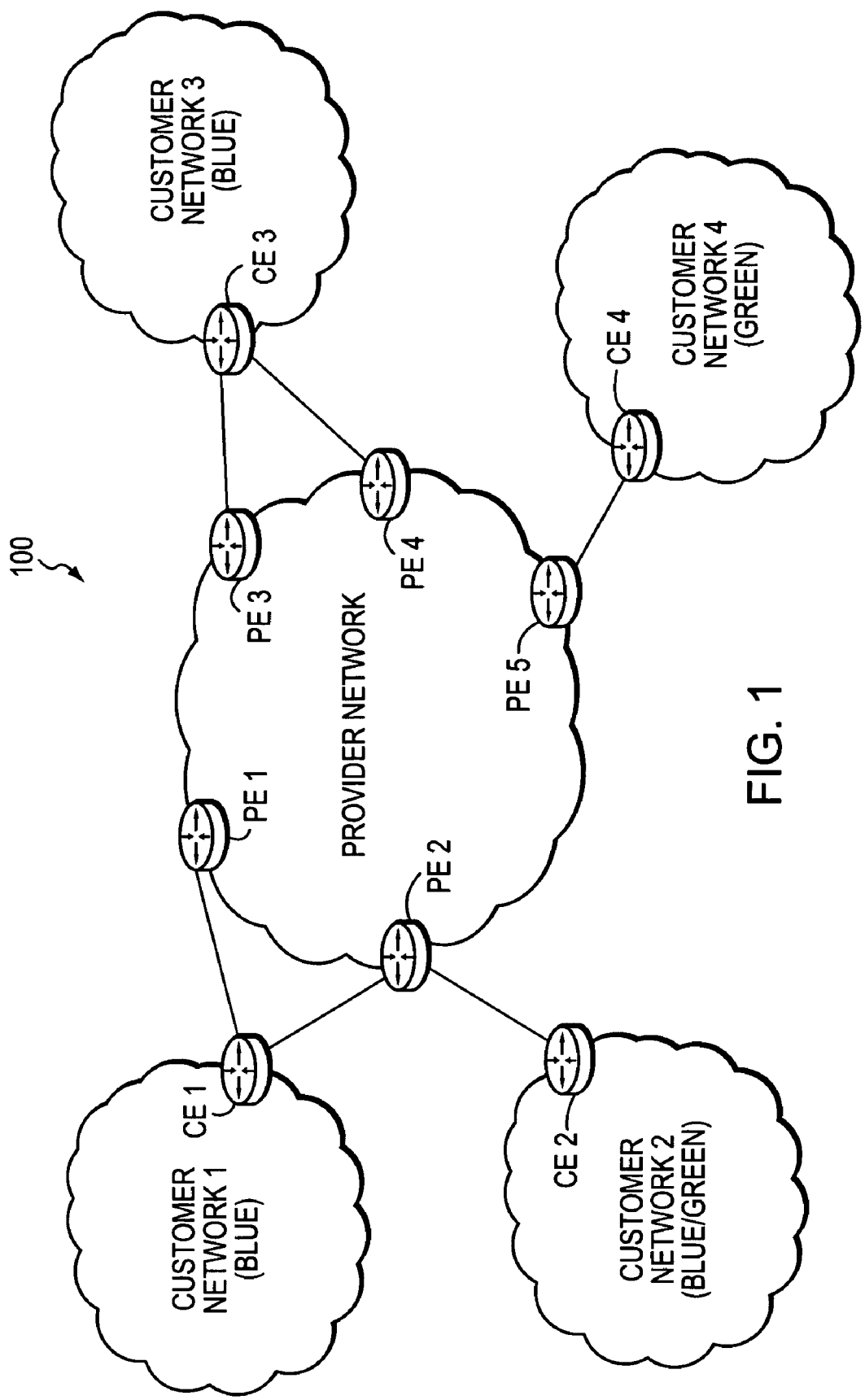
FIG. 1 is a schematic block diagram of an exemplary computer network that may be used in accordance with the present invention.

FIG. 1 is a schematic block diagram of an exemplary computer network 100 comprising a provider network, (e.g., a service provider network) interconnected to one or more customer networks (customer networks 1-4). Although the provider and customer networks are described illustratively herein as autonomous systems, those skilled in the art will appreciate that they may be configured as one or more routing domains or other networks or subnetworks. The provider network comprises one or more network nodes, including a set of communicating border nodes or routers (illustratively, provider edge devices, or "PEs") PE1-PE5, through which client communications, such as data packet traffic, can pass into and out of the provider network. The network comprises provider devices (Ps) (not shown) configured to communicate traffic and information internally within the provider network.

The customer networks 1-4 also comprise one or more network nodes, including a set of communicating border nodes or routers (illustratively, customer edge devices, or "CEs") CE1-CE4, respectively, through which client communications can pass into and out of the customer networks. For example, the PEs and CEs may be configured as connections to/from one or more virtual private networks (VPNs) e.g., for a Multi-Protocol Label Switching (MPLS)/VPN network, as will be understood by those skilled in the art. Illustratively, two VPNs are configured within network 100, denoted as a "blue" VPN and a "green" VPN. For instance, customer networks 1, 2, and 3 belong to VPN blue, while customer networks 2 and 4 belong to VPN green. Note that a single customer network (e.g., 2) may belong to more than one VPN, as will be understood by those skilled in the art. Also, a customer network need not belong to any VPNs, e.g., a customer network 5 belonging to no VPNs (not shown).

Each CE may communicate with an attached PE via a "PE-CE link" as shown, for example CE1 communicating with PE1 over link PE1-CE1. Notably, the links may also be represented as CE-PE links (e.g., link CE1-PE1), and the order of the link end nodes is equally interchangeable herein. These examples are merely representative. Those skilled in the art will understand that any number of routers, nodes, links, VPNs, and provider/customer networks may be used in the computer network 100 and connected in a variety of ways, and that the view shown herein is for simplicity. In particular, while each customer network 1-4 is shown having one CE, those skilled in the art will understand that other configurations are possible with more than one CE per customer network.

Data packets may be communicated by the provider and customer networks using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within a provider or customer network may rely on predetermined "interior" gateway protocols (IGPs), such as conventional link-state or distance-vector protocols. In addition, data packets containing network topology information may be exchanged among provider and customer networks using "external" gateway protocols, such as the Border Gateway Protocol (BGP), e.g., the Multi-Protocol (MP)-BGP. Those skilled in the art will understand that other communication protocols may be used within and among the networks, and that those mentioned above are merely representative.

Figure 2:
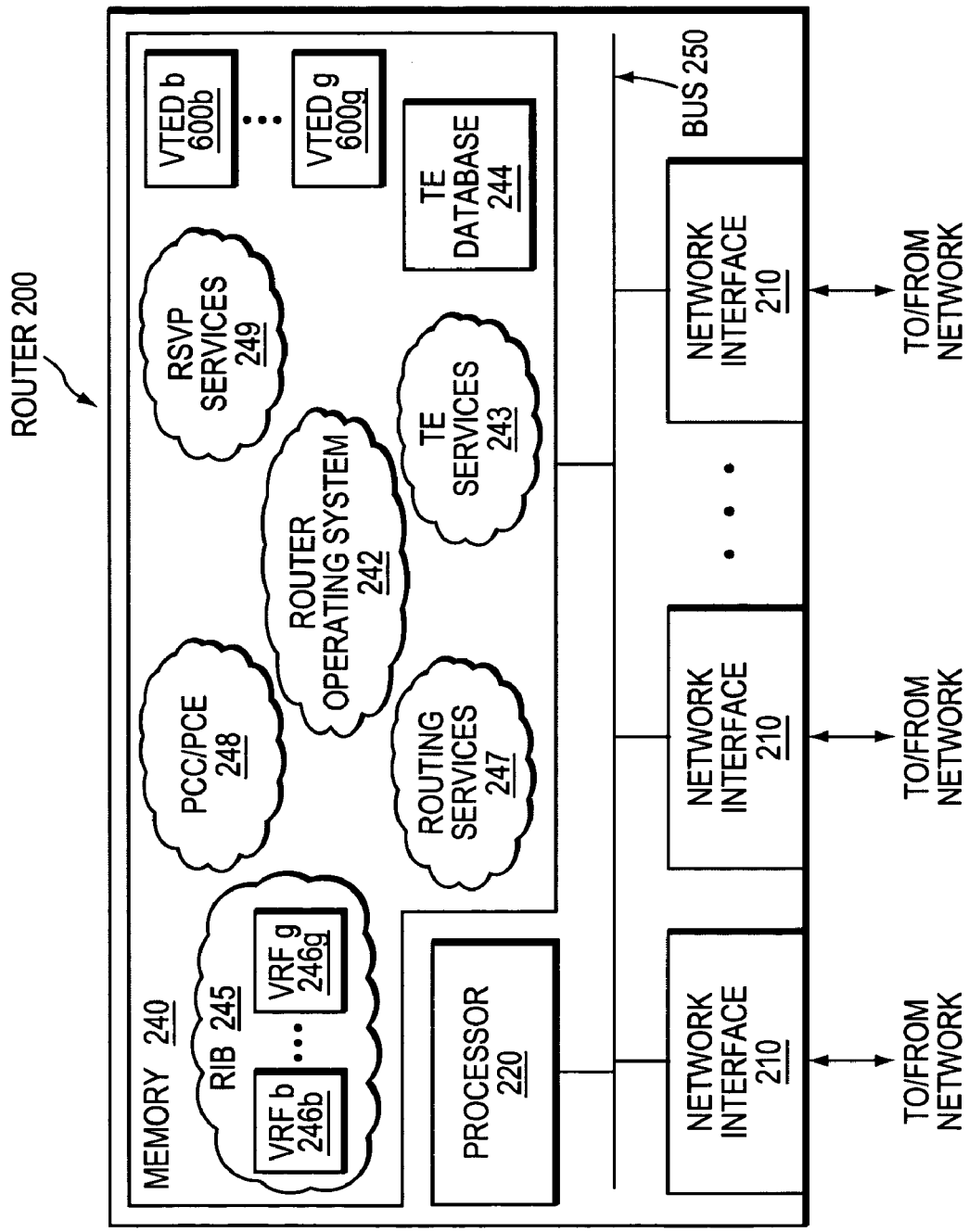
FIG. 2 is schematic block diagram of an exemplary router that may be advantageously used with the present invention.

FIG. 2 is a schematic block diagram of an exemplary node/router 200 that may be advantageously used with the present invention, such as, e.g., an edge device. The node comprises a plurality of network interfaces 210 (e.g., line cards), a processor 220, and a memory 240 interconnected by a system bus 250. The network interfaces 210 contain the mechanical, electrical and signaling circuitry for communicating data over physical links coupled to the network 100. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for VPN access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as TE Database (TED) 244, virtual routing and forwarding tables (VRFs) 246*b* through 246*g*, and VPN TEDs (VT-EDs) 600*b* through 600*g*. A router operating system 242 (e.g., the Internetwork Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may include Router Information Base (RIB) 245, Path Computation Element/Client (PCC/PCE) services 248, routing services 247, RSVP services 249, and Traffic Engineering (TE) services 243. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF, IS-IS, IP, BGP, etc. These functions may be configured to manage a forwarding information database (not shown) containing, e.g., data used to make forwarding decisions. Routing services 247 may also perform functions related to virtual routing protocols, such as maintaining VRF instances 246*b* (e.g., for VPN blue) and 246*g* (for VPN green), etc., as will be understood by those skilled in the art.

RSVP services 249 contain computer executable instructions for implementing RSVP and processing RSVP messages in accordance with the present invention. RSVP is described in RFC 2205, entitled *Resource ReSerVation Protocol* (RSVP), and in RFC 3209, entitled *RSVP-TE: Extensions to RSVP for LSP Tunnels*, both as incorporated above.

TE services 243 contain computer executable instructions for operating TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. TED 244 is illustratively resident in memory 240 and used to store TE information provided by the routing protocols, such as IGP, RSVP, and/or BGP (with TE extensions, e.g., as described herein), including, inter alia, TE topology as described herein. The TED 244 is illustratively maintained and managed by TE services 243.

BGP services (e.g., a portion of routing services 247) may be used during communication of network reachability information among devices 200 between the domains, such as through the transmission and analysis of BGP advertisements. Suppose, for example, that a new address prefix is established within an AS or a new connection is created between two or more ASes (e.g., the provider network and/or the one or more customer networks). Once the change in the network's state is detected by one of the BGP enabled devices, that device may transmit a BGP advertisement communicating the change to the other ASes. BGP services of other network nodes receive the advertisements, update their internal routing/reachability information, and may continue to transmit BGP advertisements with the new information as understood by those skilled in the art. Notably, extensions to BGP to carry information for multiple network layer protocols (e.g., IPv6, IPX, VPNv4, etc.), or "Multi-Protocol (MP)-BGP" are described in RFC 2283 entitled, *Multiprotocol Extensions for BGP-4*, dated February 1998, the contents of which are hereby incorporated by reference in its entirety.

Figure 3:
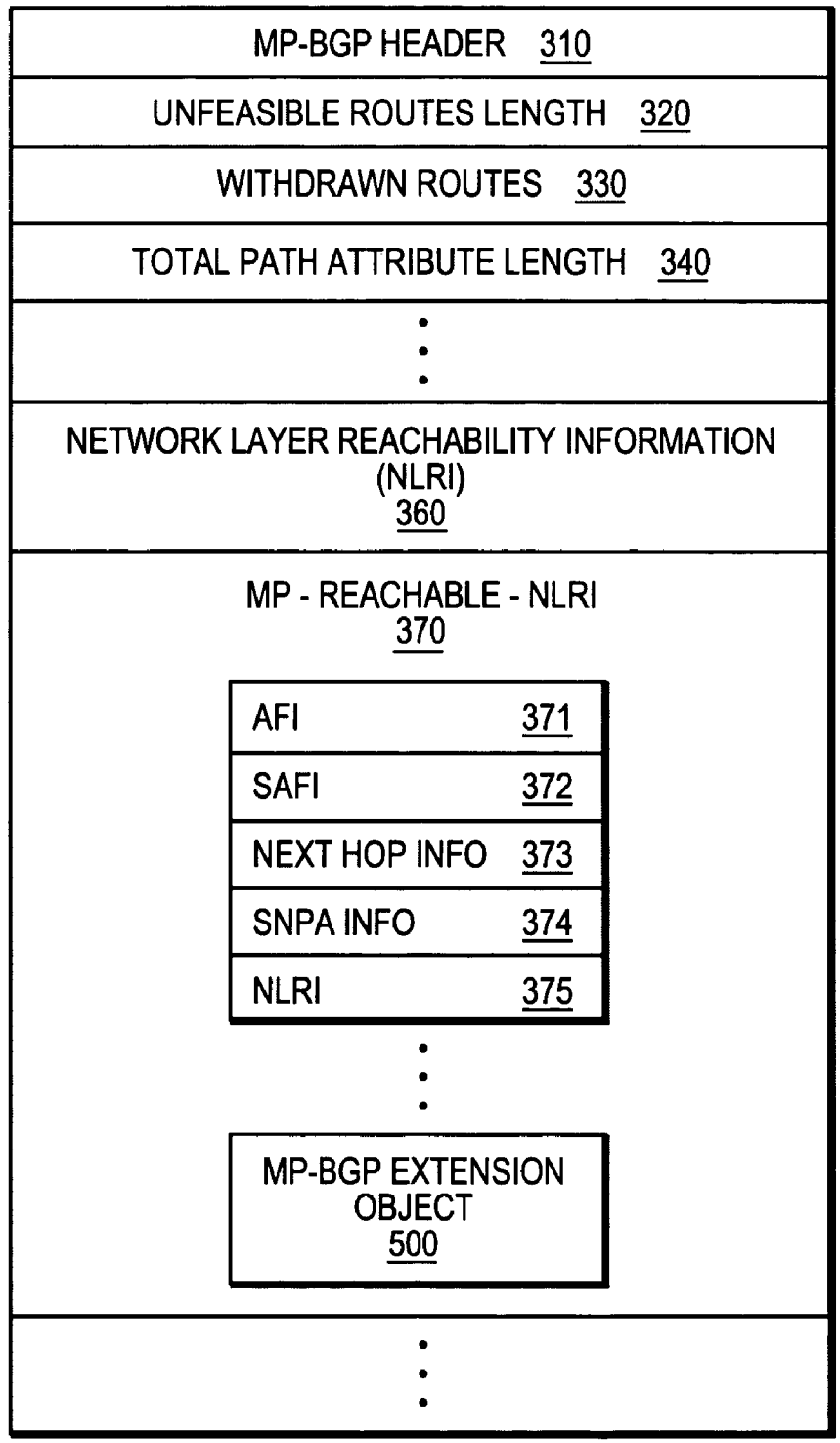
FIG. 3 is a schematic block diagram of an exemplary MP-BGP message that may be transmitted by the routers.

FIG. 3 illustrates an exemplary MP-BGP advertisement 300 that may be transmitted by BGP enabled routers 200. Illustratively, the MP-BGP advertisement 300 is an MP-BGP update message. The packet includes an MP-BGP header 310, unfeasible routes length field 320, withdrawn routes 330, total path attribute length field 340 and network layer reachability information (NLRI) 360. The BGP header 310 contains the type of MP-BGP message (e.g., an update message), the overall length of the message, and other known information, such as predictable authentication data. The unfeasible routes length field 320 denotes the variable length of the withdrawn routes 330, which contain a list of routes that are no longer used (or advertised) by the advertising BGP node. Notably, if the update message 300 only advertises feasible routes, the withdrawn routes field 330 need not be present. Other fields, such as a path attributes field (not shown) may also be included in the MP-BGP message 300.

The NLRI field 360 contains a list of address prefixes. Reachability information in the NLRI field 360 comprises one or more encoded entries containing destination address prefixes that are reachable via the advertised domain route found in the MP-BGP update message 300. An MP-BGP update message 300 can advertise at most one route to a set of destination prefixes, and all path attributes (not shown) must apply to the whole set of destination prefixes contained in the NLRI field 360.

An additional MP-BGP specific field is an MP-reachable-NLRI 370 that may contain a plurality of other sub-fields, such as Address Family Identifier (AFI) field 371, Subsequent AFI (SAFI) field 372, Next Hop information field(s) 373, Subnetwork Points of Attachment (SNPA) information field(s) 374, and NLRI field 375. AFI/SAFI fields 371 and 372 carry the identity of the Network Layer protocol associated with the Network Address in Next Hop field(s) 373 and additional information about the type of NLRI carried in the MP-reachable-NLRI attribute 370, respectively. (Presently defined AFI identities are described generally in RFC 1700, entitled *Assigned Numbers*, dated October 1994.) The remaining fields 373, 374, and 375 may be used to define conventional network topology (reachable addresses, next hops, interfaces, etc.), e.g., for PE-CE links, as will be understood by those skilled in the art, and more particularly with reference to above-referenced RFC 2283. Also, in accordance with the present invention a novel MP-BGP Extension Object 500 may be included within the MP-reachable-NLRI attribute 370, as described below. Further, an MP-BGP Unreachable NLRI attribute (not shown) may be included in the MP-BGP message 300 for unreachable (withdrawn) routes, as will be understood by those skilled in the art.

In one embodiment, the routers described herein may be IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol (with Traffic Engineering extensions), and in particular, RSVP TE signaling messages. Notably, when incorporating the use of PCEs (described below), the path computation request (and response) between PCC and PCE can be exchanged in accordance with a protocol specified in Vasseur, et al., *Path Computation Element (PCE) Communication Protocol (PCEP)—Version 1—<draft-vasseur-pce-pcep-02.txt>*, Internet Draft, September 2005, the contents of which are hereby incorporated by reference in its entirety. It should be understood that the use of RSVP or PCEP serves only as an example, and that other communication protocols may be used in accordance with the present invention.

In accordance with RSVP, to request a data flow (TE-LSP) between a sender and a receiver, the sender may send an RSVP path request (Path) message downstream to the receiver along a path (e.g., a unicast route) to identify the sender and indicate e.g., bandwidth needed to accommodate the data flow, along with other attributes of the TE-LSP. The Path message may contain various information about the data flow including, e.g., traffic characteristics of the data flow.

Also in accordance with the RSVP, a receiver establishes the TE-LSP between the sender and receiver by responding to the sender's Path message with a reservation request (Resv) message. The reservation request message travels upstream hop-by-hop along the flow from the receiver to the sender. The reservation request message contains information that is used by intermediate nodes along the flow to reserve resources for the data flow between the sender and the receiver, to confirm the attributes of the TE-LSP, and provide a TE-LSP label. If an intermediate node in the path between the sender and receiver acquires a Path message or Resv message for a new or established reservation (TE-LSP) and encounters an error (e.g., insufficient resources, failed network element, etc.), the intermediate node generates and forwards a path or reservation error (PathErr or ResvErr, hereinafter Error) message to the sender or receiver, respectively.

Figure 4:
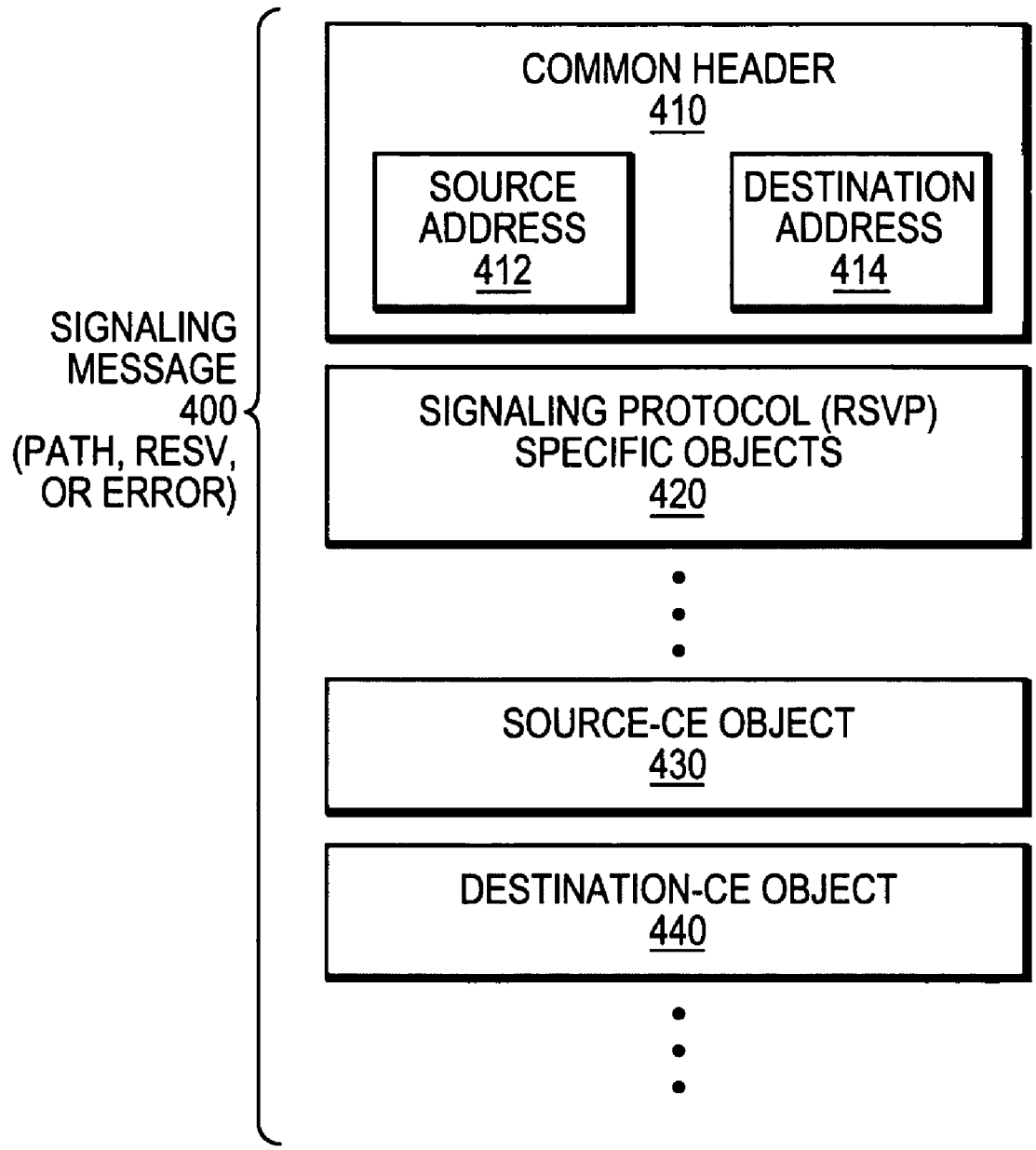
FIG. 4 is a schematic block diagram of portions of a signaling message (RSVP message) that may be advantageously used with the present invention.

FIG. 4 is a schematic block diagram of portions of a signaling message 400 (e.g., RSVP message, such as Path, Resv or Error) that may be advantageously used with the present invention. Message 400 contains, inter alia, a common header 410, one or more signaling protocol specific objects 420, as well as a novel "Source-CE object" 430 and "Destination-CE object" 440, described below. The common header 410 may comprise a source address 412 and destination address 414, denoting the origination and requested termination of the message 400. Protocol specific objects 420 contain objects necessary for each type of message 400 (e.g., Path, Resv, Error, etc.). For instance, a Path message may have a sender template object, Tspec object, Previous-hop object, LSP-Attribute object, etc. Various flags and/or type/length/value (TLV) encoding formats (not shown) may also be contained within the specific objects 420, as will be understood by those skilled in the art. A Resv message, on the other hand, may have specific objects 420 for a label object, session object, filter spec object, etc. Also, Error messages 400 (e.g., PathErr or ResvErr), may also have specific objects 420, such as for defining the type of error, etc.

It should be noted that in accordance with RSVP signaling, the state of the RSVP is refreshed on a timed interval, e.g., every thirty seconds, in which RSVP Path and Resv messages are exchanged. This timed interval is configurable by a system administrator. Moreover, various methods understood by those skilled in the art may be utilized to protect against route record objects (RROs) contained in signaling messages for a TE-LSP in the event security/privacy is desired. Such RRO filtering prevents a head-end node of the TE-LSP from learning of the nodes along the TE-LSP, i.e., nodes within the provider network.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

The present invention is directed to a technique for enabling TE on paths between CEs across a provider network ("CE-CE paths") in a computer network. According to the novel technique, TE is configured on a link from a sending provider edge device (PE) to a first CE ("PE-CE link"), e.g., a CE of one or more VPNs. The sending PE conveys TE information of the PE-CE link to one or more receiving PEs in the provider network. Upon receiving the TE information, each receiving PE expands a TE database (TED) for information regarding the provider network (i.e., a "core TED") to include TE-configured PE-CE links, e.g., by updating one or more corresponding VPN TEDs (VTEDs) for each VPN maintained by the receiving PE. Once the receiving PEs have the TE information for configured PE-CE links from the provider network, one or more TE techniques may be applied to paths from a second CE of the receiving PE to the first CE (a CE-CE path) to thereby facilitate, e.g., establishment of TE-LSPs along CE-CE paths.

In accordance with one aspect of the present invention, the sending PE conveys TE information of its TE-configured PE-CE links through a "TE advertisement." In the illustrative embodiment described herein, BGP messages, i.e., MP-BGP messages, are used to convey the TE advertisement. Illustratively, a new MP-BGP AFI/SAFI may be created for CEs connected to the sending PE via a TE-configured PE-CE link. Within an NLRI field of the MP-BGP message (e.g., MP-reachable-NLRI attribute 370), for example, various subfields may be used to convey the desired TE information.

Figure 5:
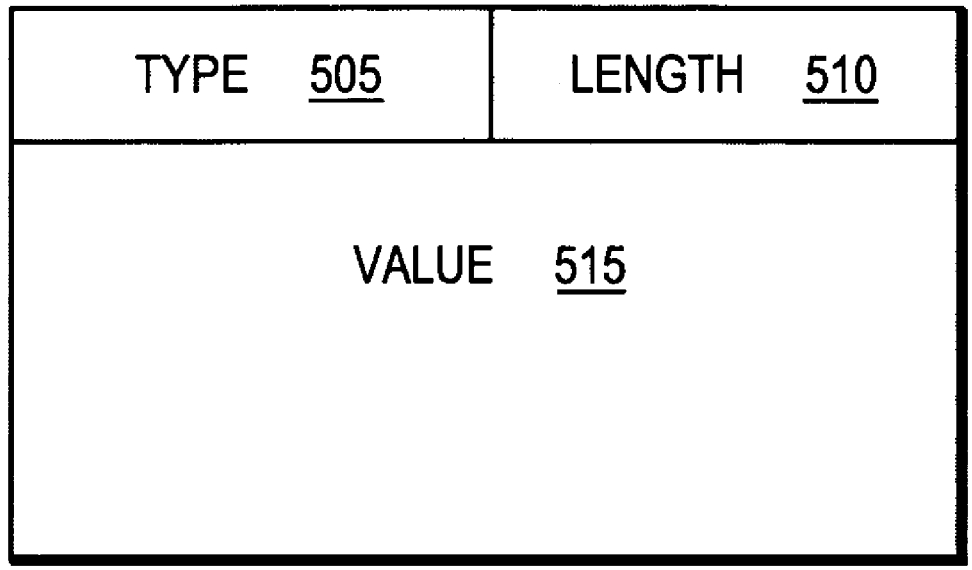
FIG. 5 is a schematic block diagram of an exemplary MP-BGP Extension Object that may be used in accordance with the present invention.

FIG. 5 is a schematic block diagram illustrating an MP-BGP Extension Object 500 illustratively encoded using a TLV format that may be advantageously used with the present invention. The TLV encoding format is a general way to communicate information between nodes, such as routers. The TLV "attribute" 500 is used to identify a type (T) of information being communicated (conveyed), a length (L) of information to be conveyed and a value (V) of the actual information conveyed. The length (L) parameter contained in the length field 510 is typically implementation-specific and can denote the length from the beginning of the Type field 505 of the attribute 500 to the end. However, the length generally denotes the length of the Value (V) field 515 and not the Type (T) or Length (L) fields. Specifically, in accordance with the present invention, Value field 515 encodes the TE information for the specified PE-CE link of the MP-BGP message 300. Notably, the TLV format described herein is merely an example, and those skilled in the art will understand that other object formats for the MP-BGP Extended object 500 may be used in accordance with the present invention.

TE information contained within the MP-BGP Extension object 500 may comprise any available TE information, such as, inter alia, an address of the CE (CE3) (e.g., in a VPN context, such as a VPNv4 address), an address of the sending PE (PE3), a route target (RT) (e.g., an associated color, blue), and one or more TE-based PE-CE link attribute information fields. Example TE-based PE-CE link attribute information comprise, e.g., dynamically measured IP bandwidth, reservable MPLS bandwidth, unreserved bandwidth, administrative group (color), TE metrics, etc.

Once the TE information is collected for the PE-CE link (e.g., link PE3-CE3), the sending PE (PE3) inserts the TE information into the MP-BGP message 300, particularly into an MP-BGP Extension Object 500, and transmits the message 300 to one or more other receiving PEs accordingly. Conventional flooding (information leaking) may be applied to the message 300, such as based on the RT, CE address, etc., as will be understood by those skilled in the art. Those skilled in the art will also understand that the sending PE may, in fact, send the MP-BGP message 300 to a route reflector of the provider network (not shown) for redistribution (reflection) to the one or more receiving PEs.

Notably, the TE advertisement (MP-BGP message 300) may have a limited distribution into the provider network (e.g., to particular PEs). For example, Outbound Route Filtering (ORF) or RT constraints may be used to limit distribution as will be understood by those skilled in the art. For instance, in the event a receiving PE does not manage any TE-enabled PE-CE links for a particular VPN, that receiving PE may not wish to receive notifications regarding that particular VPN. That PE may then request through an ORF or RT constraint that other sending PEs not send such information regarding that VPN. Also, BGP capability advertisements may be used by receiving PEs to inform sending PEs of their ability (or inability) to exchange the novel TE information.

Moreover, the frequency of TE advertisement updates may or may not be limited. For instance, a conventional approach limits the frequency of TE information update messages (e.g., in the case of conventional internal IGP update messages) by only sending an update after a configured threshold of change in TE information (e.g., bandwidth) occurs. While this practice limits the transmission of update messages, it also increases the chances that TE information is out-of-date. In accordance with the present invention, however, this limitation may not be necessary, e.g., due to the lesser number of TE-LSPs traversing PE-CE links (described below), as will be understood by those skilled in the art. If desired, then, the limitation may be deactivated, e.g., in order to increase the chance that the TE information is up-to-date (thus minimizing the call setup failure rate for TE-LSPs, as will be understood by those skilled in the art).

In accordance with another aspect of the present invention, the PEs establish a VTED for each VPN of interest, e.g., for each VPN to which the PE is connected should there be at least one local TE-enabled link for that VPN. Notably, VTEDs need not be created for VPNs that are not configured for TE, as will be understood by those skilled in the art. Upon receipt of PE-CE link TE information (e.g., from the BGP message 300), the receiving PE populates its one or more VTEDs with the corresponding information. FIG. 6 is a schematic block diagram of an exemplary VTED 600 that may be used in accordance with the present invention. VTED 600 is illustratively stored in memory 240 and includes one or more entries 620, each comprising a plurality of fields for storing a PE-CE link identification 605 (e.g., PE1-CE1), and TE information 610 pertaining to the learned TE information for the corresponding PE-CE link. The VTED 600 is illustratively maintained and managed by TE Services 243. Accordingly, TE Services 243 populates the VTED 600 with learned TE information based on received MP-BGP messages 300 in accordance with the present invention.

One VTED may be created for each VPN managed by the PE. For instance, TE information for a PE-CE link of a particular VPN may be inserted into a VTED corresponding to that VPN. For example, PE-CE link PE3-CE3 belongs to VPN blue, and as such should be inserted into a VTED corresponding to VPN blue. Illustratively, FIG. 6 shows an exemplary VTEDb (600b) corresponding to the blue VPN TE topology of FIG. 1. While a separate VTED is shown for each VPN, those skilled in the art will understand that a single VTED 600 may be used in accordance with the present invention, provided that a VPN distinguishing identifier is associated with each entry 620. TE information stored within the VTED 600 should be kept local (e.g., local to the VPN), but at the same time accessible to processes running on the PE that require the TE information (e.g., a PCE, as described below).

Each VTED 600 may point to (reference) the core TED 244 for the internal links of the provider network. It is possible to place the core TED information within each of the separate VTEDs 600, however because the information would be the same throughout, memory may be conserved by instead referencing the core TED 244. By combining information from the VTEDs with the core TED, a substantially complete topology of TE-configured PE-CE links of the provider network may be available to the PEs. This PE-CE link TE topology therefore creates a CE-CE path TE topology for the provider network and surrounding (TE-enabled) CEs in accordance with the present invention.

Figure 7:
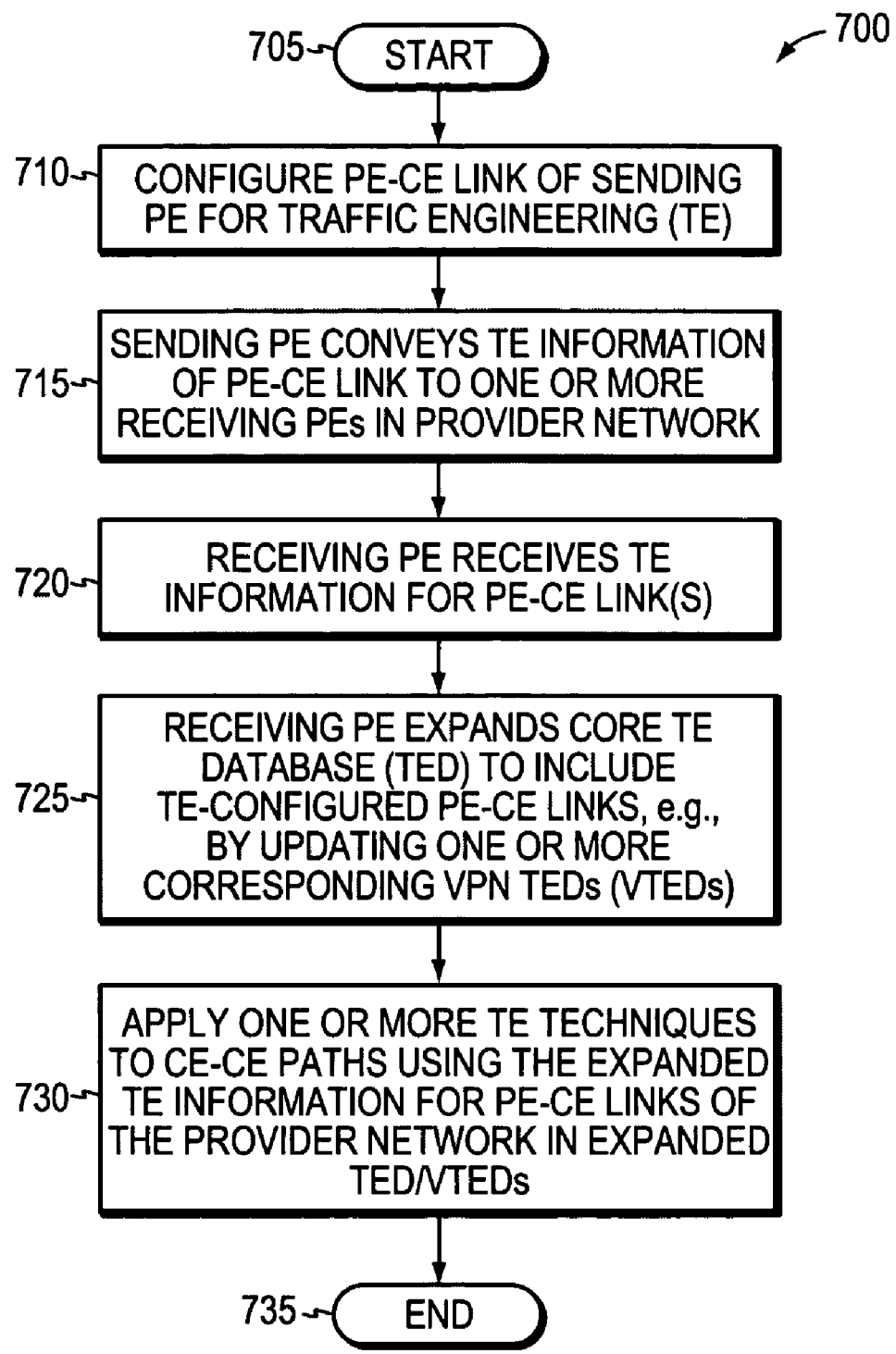
FIG. 7 is a flowchart illustrating a procedure for enabling TE on CE-CE paths in a computer network in accordance with the present invention.

FIG. 7 is a flowchart illustrating a procedure for enabling TE on CE-CE paths in a computer network in accordance with the present invention. The procedure 700 starts at step 705, and continues to step 710, where one or more PE-CE links (e.g., link PE3-CE3) of a sending PE (e.g., PE3) are configured for TE. The sending PE conveys TE information of the PE-CE link(s) to one or more receiving PEs (e.g., PE1) in the provider network in step 715, which is received by the receiving PEs in step 720. At step 725, a receiving PE expands its core TED 244 to include the TE-configured PE-CE links (e.g., link PE3-CE3), such as by updating one or more corresponding VTEDs 600, as described above. Once the TED is expanded to include TE information for PE-CE links, e.g., by the one or more updated VTEDs, one or more TE techniques may be applied to CE-CE paths (e.g., a path from CE1 to CE3) in step 730, such as in accordance with the techniques described below (e.g., in FIG. 9 or 11 below). The procedure then ends at step 735. Notably, periodic TE information updates may be sent from the sending PE for its PE-CE links, in which case the procedure proceeds similarly from step 715.

Figure 8:
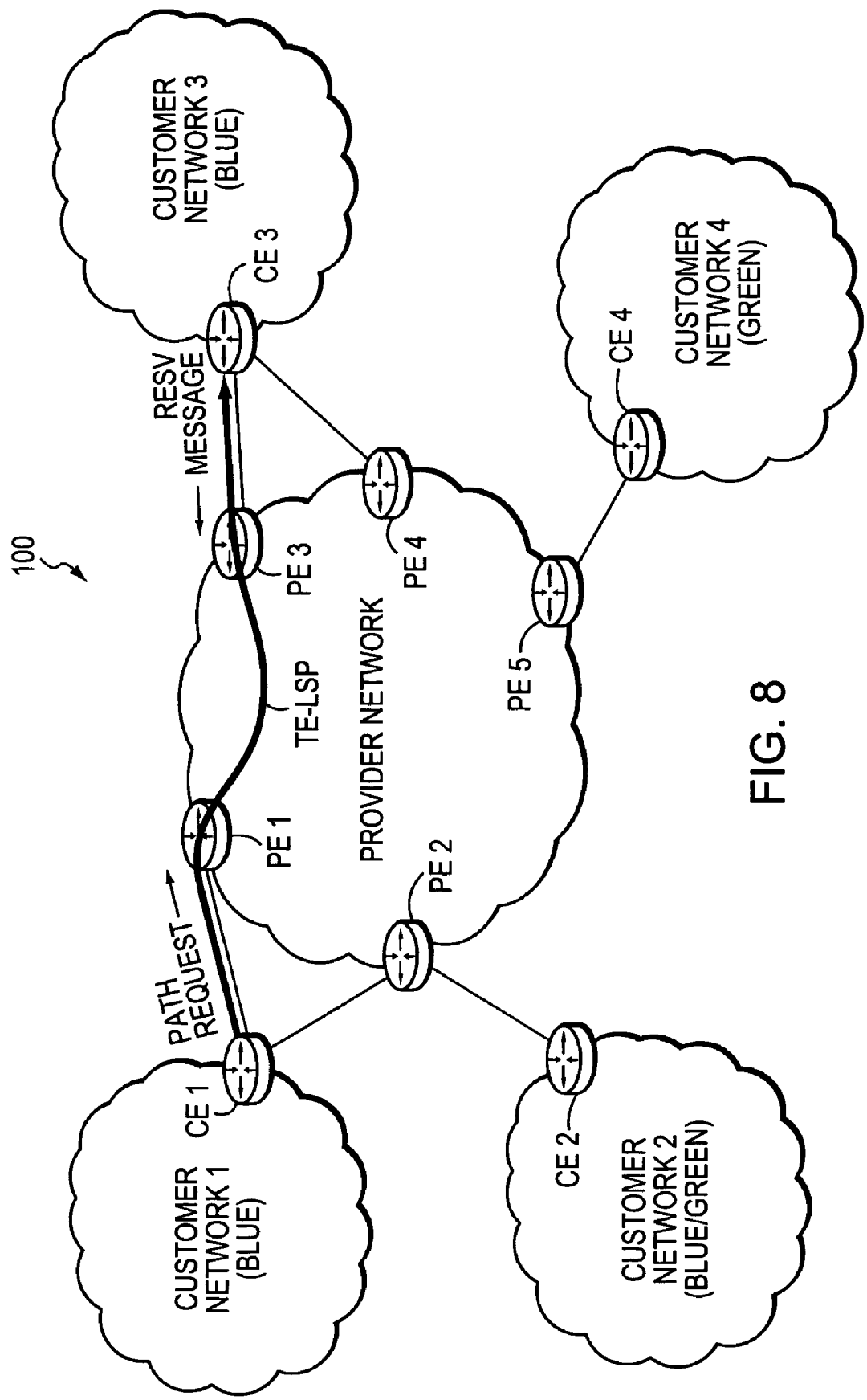
FIG. 8 is a schematic block diagram of the computer network in FIG. 1 with a TE-LSP created in accordance with the present invention.

In accordance with yet another aspect of the present invention, the substantially complete topology of TE-configured PE-CE links may be used for a variety of TE techniques for CE-CE paths across the provider network. For example, a first TE technique may establish Multi-Protocol Label Switching (MPLS) TE label switched paths (LSPs) along CE-CE paths across the provider network. According to the first technique, described with reference to FIG. 8, a source CE (CE1) wishing to create a TE-LSP to a destination CE (CE3) sends a path request (e.g., RSVP Path message 400) to an attached PE (PE1), e.g., randomly selected in the event more than one attached PE exists. The attached PE, or ingress PE, receives the request and inspects the address (e.g., a VPN address) of the destination CE. By performing a VRF lookup for the VPN address, the ingress PE can determine which VTED 600 corresponds to the destination CE (e.g., VTED 600b for VPN blue). Using the TE topology, the ingress PE determines the best TE-based route for the path from itself (e.g., in the absence of any policy violation), illustratively traversing PE3, and attempts to signal the TE-LSP accordingly. If the path signaling fails, an error may be returned to the source CE (e.g., RSVP PathErr message 400). The source CE may then attempt to employ a different PE device (e.g., PE2), if available. In the event the signaling is successful, the TE-LSP is established, and an RSVP Resv message 400 may be returned to the source CE.

Figure 9:
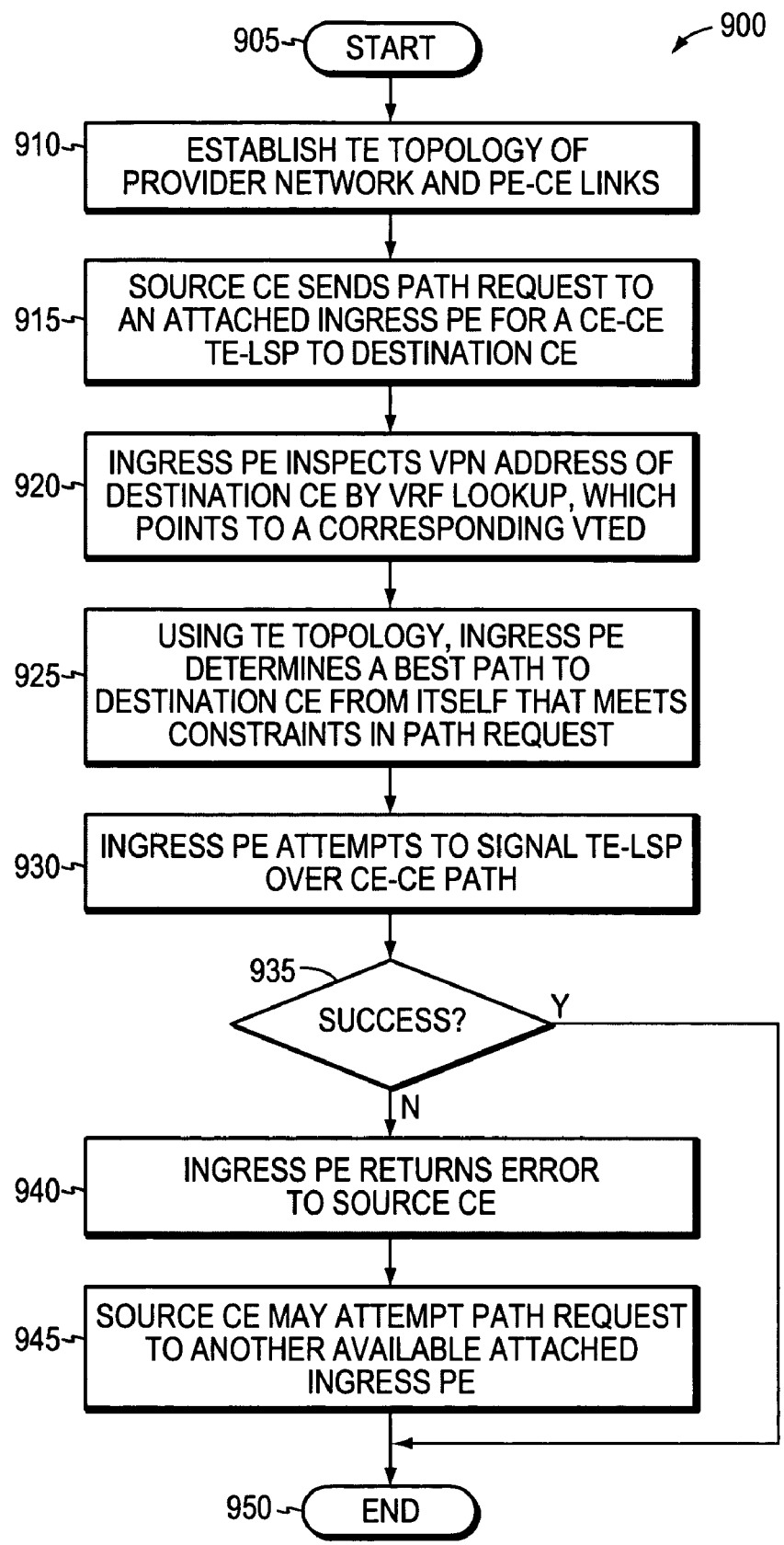
FIG. 9 is a flowchart illustrating a procedure for establishing MPLS TE-LSPs along CE-CE paths across the provider network in accordance with the present invention.

FIG. 9 is a flowchart illustrating a procedure for establishing MPLS TE-LSPs along CE-CE paths across the provider network in accordance with the present invention.

The procedure 900 starts at step 905, and continues to step 910, where the TE topology of the provider network and PE-CE links is established, such as in accordance with FIG. 7 above. At step 915, the source CE (e.g., CE1) sends a Path request message (Path message 400) to an attached ingress PE (e.g., randomly selected PE1) for a CE-CE TE-LSP to a destination CE (e.g., CE3). By performing a VRF lookup as described above, the ingress PE inspects the destination CE's VPN address from the Path message in step 920, which points to a corresponding VTED 600. In step 925, the ingress PE uses the TE topology of the VTED to determine a best path from itself to the destination CE that meets any constraints contained within the Path message 400. Notably, as described above, the ingress PE determines a best CE-CE path that traverses the ingress PE, i.e., already including the first CE-PE link from the source CE. Once the best CE-CE path is determined traversing the ingress PE, the ingress PE attempts to signal the TE-LSP over the CE-CE path in step 930. If the signaling is unsuccessful in step 935, the ingress PE returns a Path Error message to the source CE in step 940, which may then attempt to send a Path request message to another available and attached ingress PE (e.g., PE2). Otherwise, if the signaling is successful in step 935, the TE-LSP is established, and the procedure ends at step 950.

Figure 10:
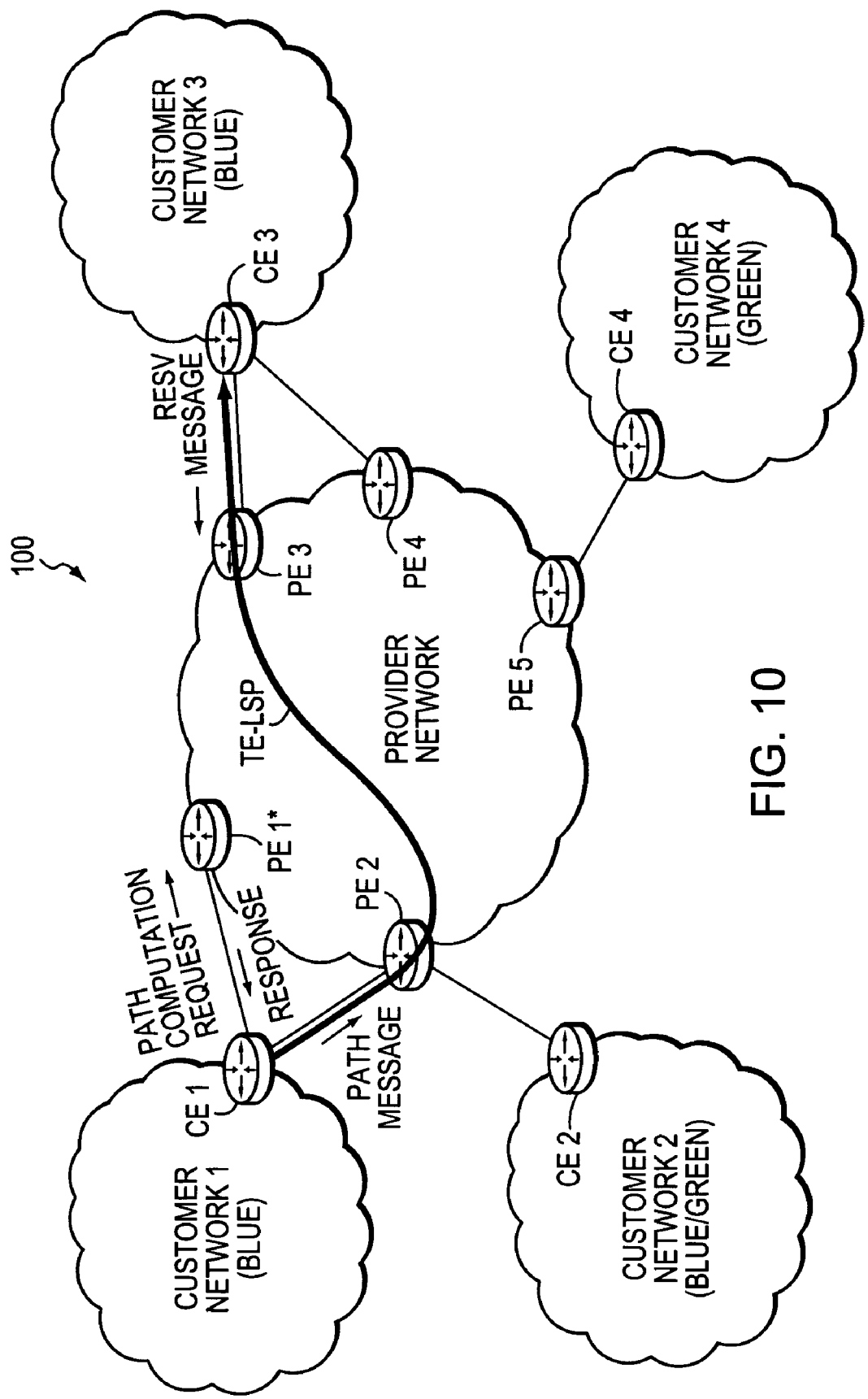
FIG. 10 is a schematic block diagram of the computer network in FIG. 1 showing the creation of a TE-LSP using a PCE in accordance with the present invention.

A second example TE technique may also establish MPLS TE-LSPs along CE-CE paths, but instead uses a path computation element (PCE). The PCE (e.g., a PE configured as a PCE) may have a more complete TE topology (e.g., not simply from its own view), and may be used to determine the best CE-CE path from any attached ingress PE, to compute diverse paths, to locate lesser constrained paths, etc. For instance, as described with reference to FIG. 10, a source CE (CE1) sends a path computation request to a PCE (PE1*) for a TE-LSP to a destination CE (CE3). Notably, the source CE may learn of the PCE through PCE discovery (PCED) messages, or through manual configuration. The PCE receives the path computation request and, using the TE topology as described in FIG. 8 (VRF lookups, VTEDs, etc.), computes the best CE-CE path from any attached PE (PE1 or PE2) in accordance with conventional PCE computation techniques as will be understood by those skilled in the art. Illustratively, assume that the best CE-CE path from CE1 to CE3 traverses PE2 and PE3. The PCE may then inform the source CE of the computed path, such as in the form of conventional loose hops (i.e., informing the source CE of the ingress and egress PEs, PE2 and PE3, respectively), or otherwise encrypted to protect the privacy of the internal provider network. Examples of encryption techniques that may be used include, inter alia, encrypted route objects (EROs) as described in commonly-owned copending U.S. patent application Ser. No. 10/983,327, entitled SYSTEM AND METHOD FOR RETRIEVING COMPUTED PATHS FROM A PATH COMPUTATION ELEMENT USING ENCRYPTED OBJECTS, and path keys as described in commonly-owned copending U.S. patent application Ser. No. 10/982,641, entitled SYSTEM AND METHOD FOR RETRIEVING COMPUTED PATHS FROM A PATH COMPUTATION ELEMENT USING A PATH KEY, both filed by Vasseur et al., on Nov. 5, 2004, both of which are hereby incorporated by reference in their entirety. Using the computed path, the source CE may begin signaling the TE-LSP accordingly, e.g., with reference to FIG. 10.

Notably, the use of a PCE to compute CE-CE paths prevents excess signaling created by failed attempts to establish the TE-LSP. Particularly, the enhanced knowledge a PCE affords, as will be understood by those skilled in the art, allows for the computation of a path that may consider real-time network traffic, e.g., other TE-LSPs currently employed throughout the network. The PCE may also compute diverse paths (i.e., diverse from other TE-LSPs), load-balanced paths (e.g., based on available bandwidth, etc.), as will also be understood by those skilled in the art. Further, unlike conventional Multi-PCE path computation for inter-domain paths (across multiple ASes), the use of PCEs in accordance with the present invention only requires the use of one PCE having knowledge of the TE topology for the PE-CE links of the provider network. As such, signaling is further reduced to a single path computation request and a single path computation response, as opposed to multiple requests/responses of the Multi-PCE path computation. Moreover, unlike the path determined from a selected ingress PE as mentioned above with reference to FIG. 8 and FIG. 9, the PCE may be advantageously used to compute the best CE-CE path that includes any available ingress PE.

Figure 11:
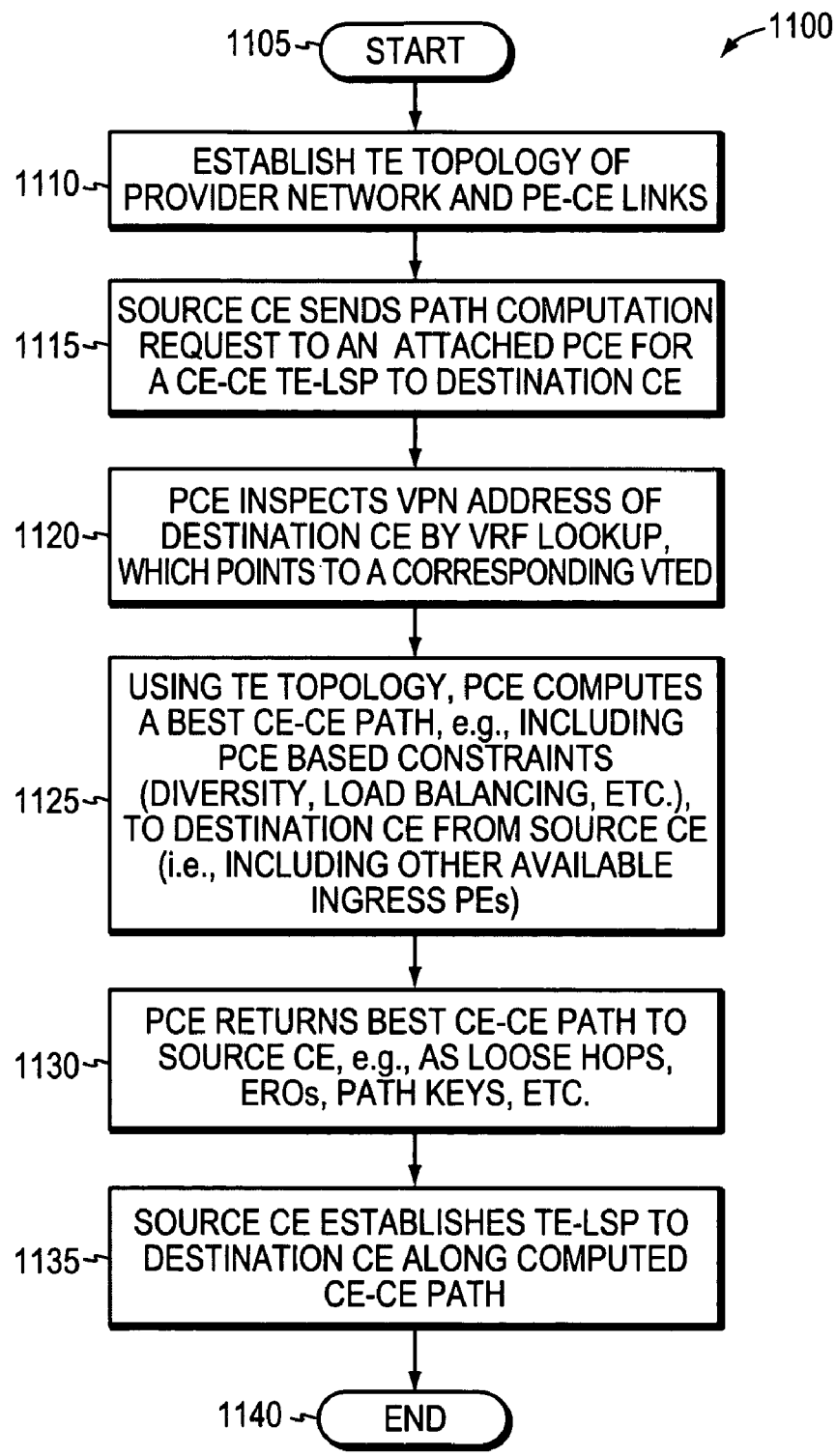
FIG. 11 is a flowchart illustrating a procedure for establishing MPLS TE-LSPs along CE-CE paths across the provider network using a PCE in accordance with the present invention.

FIG. 11 is a flowchart illustrating a procedure for establishing MPLS TE-LSPs along CE-CE paths across the provider network using a PCE in accordance with the present invention. The procedure 1100 starts at step 1105, and continues to step 1110, where the TE topology of the provider network and PE-CE links is established, such as in accordance with FIG. 7 above. At step 1115, the source CE (e.g., CE1) sends a path computation request message to an attached PCE (e.g., PE1*, manually configured or as learned from a PCED message) for a CE-CE TE-LSP to a destination CE (e.g., CE3). By performing a VRF lookup as described above, the PCE inspects the destination CE's VPN address from the Path message in step 1120, which points to a corresponding VTED 600. In step 1125, the PCE uses the TE topology of the VTED to determine a best CE-CE path to the destination CE that meets any constraints contained within the path computation request. Notably, as described above, the PCE computes a best CE-CE path from the source CE that may traverse any available ingress PE (e.g., PE1 or PE2), and that meets additional PCE-based constraints, such as, e.g., diversity, load balancing, etc., also as described above. Once the PCE computes the CE-CE path, at step 1130 the PCE returns the CE-CE path to the source CE, e.g., as loose hops, EROs, path keys, etc., as described above to protect the privacy of the internal provider network topology. The source CE may then establish the TE-LSP to the destination CE along the computed CE-CE path in step 1135 accordingly. The procedure ends in step 1140.

In accordance with yet another aspect of the present invention, extensions to signaling messages for the TE-LSPs may be utilized to protect and/or interpret private source and destination addresses. For instance, CEs generally have private addresses known only to one or more attached PEs and/or only within a given VPN context. As such, other devices, e.g., other PEs, provider devices (Ps), etc., may not understand the CE addresses as source or destination addresses during the transmission of a signaling message. Accordingly, two novel objects may be created to carry the source and destination addresses (e.g., VPNv4 addresses) of the source CE (Source-CE object 430) and destination CE (Destination-CE object 440) within the signaling message 400, e.g., RSVP Path, Resv, PathErr, etc.

Upon receiving a signaling message 400 from an ingress (source) CE (CE1), the attached ingress PE (PE1) extracts the source and destination (CE3) addresses (e.g., VPN addresses) present in the message, such as, e.g., from a source address 412 and destination address 414, respectively, and inserts them into the Source-CE object 430 and Destination-CE object 440, accordingly. Those skilled in the art will understand that while two separate objects are shown, a single object may instead be used containing both the source and destination addresses. (Alternatively, the ingress PE may extract the source and destination addresses from a SENDER-TEMPLATE object and SESSION object, not shown, respectively.) The ingress PE then replaces the source and destination addresses of the signaling message with the addresses (e.g., IP addresses) of the ingress PE and egress PE (PE3) respectively. Notably, the ingress PE determines the egress PE address from the determined or computed (PCE) path, as described above. With the known addresses of the PEs, the internal devices of the provider network may forward the signaling message according to established routing topologies and techniques. Upon receiving the modified signaling message, the egress PE replaces the source and destination addresses of the modified signaling message with the addresses carried within the Source-CE object 430 and Destination-CE object 440, accordingly, and forwards the message to the destination CE. For a return message (e.g., from CE3 to CE1), the same process may be applied, but with different (i.e., reversed) source and destination addresses. For Error messages 400 that originate from within the provider network (e.g., at a P), the ingress router may be configured to exchange the addresses within the Source-CE object 430 and Destination-CE object 440 in order to forward the error message to the source CE accordingly. In this case, the source of the error message may be translated to the ingress PE for protection/privacy, or remain as the source of the error message (e.g., the originating P).

Figure 12:
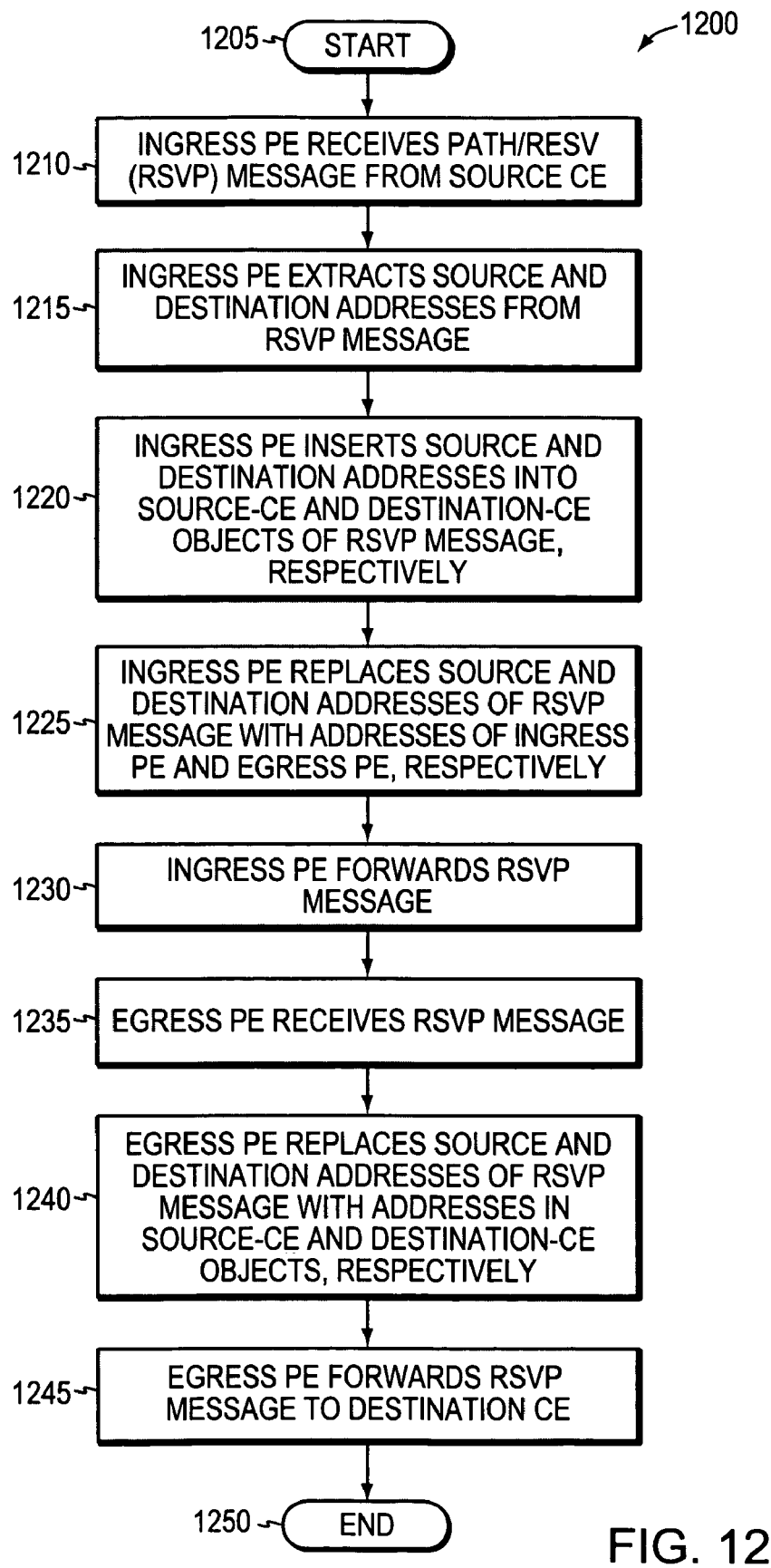
FIG. 12 is a flowchart illustrating a procedure for utilizing signaling extensions to protect and/or interpret private source and destination addresses of CEs in accordance with the present invention.

FIG. 12 is a flowchart illustrating a procedure for utilizing signaling extensions to protect and/or interpret private source and destination addresses of CEs in accordance with the present invention. The procedure 1200 starts at step 1205, and continues to step 1210, where an ingress PE (e.g., PE1) receives a signaling (RSVP) message (e.g., a Path, Resv, or PathErr message) from a source CE (e.g., CE1) of the RSVP message. Notably, the source CE of a Resv message is the destination CE (e.g., CE3) of the TE-LSP, as will be understood by those skilled in the art. At step 1215, the ingress PE extracts the source and destination addresses from the RSVP message (e.g., CE1 and CE3 from 412 and 414, respectively), and at step 1220 inserts the addresses into Source-CE object 430 and Destination-CE object 440 of the RSVP message, respectively. Once the addresses of the CEs are stored (e.g., the VPN-based addresses), the ingress PE replaces the CE addresses with addresses for the ingress PE (source address) and the egress PE (destination address) in step 1225. The ingress PE may then forward the RSVP message in step 1230, which the egress PE receives in step 1235. Upon receiving the message, the egress PE replaces the source and destination addresses in step 1240 with the addresses in the Source-CE object 430 and Destination-CE object 440, respectively. The egress PE may then forward the RSVP message to the destination CE in step 1245 accordingly. The procedure ends at step 1250.

As will be understood by those skilled in the art, other TE techniques may be used in accordance with the present invention, such as, e.g., to determine optimal CE-CE paths, to load balance traffic across multiple CE-CE paths, to guarantee bandwidth for CE-CE paths, to provide fast reroute (FRR) for CE-CE paths, etc. The creation of TE-LSPs (with and without a PCE) as described above is merely one representative example, and other TE techniques that utilize the established TE topology are within the scope of the present invention.

Advantageously, the novel technique enables TE on CE-CE paths in a computer network. By conveying TE information for PE-CE links, the novel technique allows PEs of the provider network to expand their TE topologies to include the PE-CE links. Accordingly, by including TE information for PE-CE links, the novel technique allows for TE techniques to be applied to CE-CE paths. Particularly, MPLS TE-LSPs may be efficiently created along CE-CE paths. Also, the dynamic nature of the novel technique alleviates the need for cumbersome manual configuration.

While there has been shown and described an illustrative embodiment that enables TE on CE-CE paths in a computer network, it is to be understood that various other adaptations and modifications may be made within the spirit and scope of the present invention. For example, the invention has been shown and described herein with illustrative examples for creating TE-LSPs. However, the invention in its broader sense is not so limited, and may, in fact, be used with other TE techniques. Also, while the invention has been shown and described using MP-BGP messages for conveying TE information and RSVP messages for signaling TE-LSPs, the invention may, in fact, be used with other messaging protocols, as will be understood by those skilled in the art. As will also be understood by those skilled in the art, the present invention may also be applied to PE-CE links even in the event the CE is owned or managed by the provider network, as is sometimes the case. Further, the present invention may also apply in the event a CE to the provider network is a PE for another provider network. Still further, while the invention has been shown and described for multiple VPNs, the invention may, in fact, be used with a single VPN, or more broadly, without any VPNs, in which case a single VTED exists for all PE-CE links.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for enabling establishing Multi-Protocol Label Switching (MPLS) Traffic Engineering (TE) Label Switched Paths (LSPs) on paths between customer edge devices (CEs) across a provider network (CE-CE paths) in a computer network, the method comprising:
   establishing a TE topology of the provider network that includes TE information for links between one or more provider edge devices (PEs) and one or more CEs (PE-CE links);
   sending a path request message from a source CE to an ingress PE attached to the source CE, the path request message requesting a CE-CE TE-LSP to a destination CE;
   determining a best path from the ingress PE to the destination CE based on the TE information for PE-CE links to the destination CE; and
   attempting to signal the requested TE-LSP along the determined best path.

2. The method as in claim 1, further comprising:
   in the event the attempt to signal is unsuccessful, returning an error message from the ingress PE to the source CE.

3. The method as in claim 2, further comprising:
   sending a second path request message from the source CE to a second ingress PE attached to the source CE.

4. The method as in claim 1, further comprising:
   determining at the ingress PE a virtual private network (VPN) corresponding to the destination CE; and
   determining the best path from the ingress PE to the destination CE based on TE information pertaining to the corresponding VPN.

5. The method as in claim 1, further comprising:
   replacing, at the ingress PE, private addresses of the source CE and destination CE contained within the path request message with addresses of the ingress PE and an egress PE attached to the destination CE, respectively, to form a modified path request message;
   storing the private addresses of the source CE and destination CE within objects of the modified path request message;
   receiving the modified path request message at the egress PE; and
   replacing, at the egress PE, the addresses of the ingress PE and the egress PE contained within the modified path request message with the stored addresses of the source CE and destination CE, respectively.

6. A method for enabling establishing Multi-Protocol Label Switching (MPLS) Traffic Engineering (TE) Label Switched Paths (LSPs) on paths between customer edge devices (CEs) across a provider network (CE-CE paths) in a computer net-work, the method comprising:
   establishing a TE topology of the provider network that includes TE information for links between one or more provider edge devices (PEs) and one or more CEs (PE-CE links);
   sending a path computation request message from a source CE to a path computation element (PCE) attached to the source CE, the path computation request message requesting a CE-CE TE-LSP to a destination CE;
   computing a best path from the source CE to the destination CE based on the TE information for PE-CE links from the CE and PE-CE links to the destination CE;
   returning the computed best path from the PCE to the source CE; and
   signaling the requested TE-LSP along the computed best path.

7. The method as in claim 6, further comprising:
   determining, at the PCE, a virtual private network (VPN) corresponding to the destination CE; and
   computing the best path from the source CE to the destination CE based on TE information pertaining to the corresponding VPN.

8. The method as in claim 6, further comprising:
   informing the source CE of the PCE by one of either manual configuration or a PCE discovery message.

9. The method as in claim 6, further comprising:
   returning the computed best path from the PCE to the source CE as one of either a loose hop route, an encrypted route object (ERO), or a path key.

10. The method as in claim 6, further comprising:
    computing the best path from the source CE to the destination CE based on the TE information, the best path having one or more constraints selected from a group comprising: diversity from other TE-LSPs and load balanced with other TE-LSPs.

11. The method as in claim 6, wherein the signaling utilizes one or more signaling messages, the method further comprising:
    replacing, at an ingress PE of the computed path attached to the source CE, private addresses of the source CE and destination CE contained within the signaling message with addresses of the ingress PE and an egress PE attached to the destination CE, respectively, to form a modified signaling message;
    storing the private addresses of the source CE and destination CE within objects of the modified signaling message;

receiving the modified signaling message at the egress PE; and replacing, at the egress PE, the addresses of the ingress PE and the egress PE contained within the modified signaling message with the stored addresses of the source CE and destination CE, respectively.

12. A method for sending signaling messages for Traffic Engineering (TE) Label Switched Paths (LSPs) on paths from a source customer edge devices (CEs) to a destination CE across a provider network (CE-CE paths) in a computer network, the method comprising:

replacing, at an ingress PE of the CE-CE path attached to the source CE, private addresses of the source CE and destination CE contained within the signaling message with addresses of the ingress PE and an egress PE attached to the destination CE, respectively, to form a modified signaling message;

storing the private addresses of the source CE and destination CE within objects of the modified signaling message;

receiving the modified signaling message at the egress PE; and replacing, at the egress PE, the addresses of the ingress PE and the egress PE contained within the modified signaling message with the stored addresses of the source CE and destination CE, respectively.

13. An apparatus comprising:
one or more network interfaces;
a processor coupled to the one or more network interfaces and configured to execute software processes; and
a memory configured to store a Traffic Engineering (TE) process executable by the processor, the TE process configured to establish a TE topology of a provider network that includes TE information for links between one or more provider edge devices (PEs) and one or more customer edge devices (CEs) (PE-CE links), receive a path request message from a source CE on one of the one or more network interfaces, the path request message requesting a CE-CE Traffic Engineering Label Switched Path (TE-LSP) across the provider network to a destination CE, determine a best path from an ingress PE to the destination CE based on the TE information for PE-CE links to the destination CE, and attempt to signal the requested TE-LSP along the determined best path.

14. The apparatus of claim 13, wherein the TE process is further configured to return an error message to the source CE, in the event the attempt to signal is unsuccessful.

15. The apparatus of claim 13, wherein the TE process is further configured to determine a virtual private network (VPN) corresponding to the destination CE, and determine the best path from the ingress PE to the destination CE based on TE information for the corresponding VPN.

16. The apparatus of claim 13, wherein the TE process is further configured to replace one or more private addresses of the source CE and destination CE contained within the path request message with addresses of the ingress PE and an egress PE attached to the destination CE, respectively, to form a modified path request message.

17. The apparatus of claim 16, wherein the TE process is further configured to store the private addresses of the source CE and destination CE within objects of the modified path request message.

18. An apparatus comprising:
one or more network interfaces;
means for establishing a Traffic Engineering (TE) topology of a provider network that includes TE information for links between one or more provider edge devices (PEs) and one or more customer edge devices (CEs) (PE-CE links);
means for receiving a path request message from a source CE, the path request message requesting a CE-CE Traffic Engineering Label Switched Path (TE-LSP) across the provider network to a destination CE;
means for determining a best path from an ingress PE to the destination CE based on the TE information for PE-CE links to the destination CE; and
means for attempting to signal the requested TE-LSP along the determined best path.

19. An apparatus comprising:
one or more network interfaces;
a processor coupled to the one or more network interfaces and configured to execute software processes; and
a memory configured to store a Traffic Engineering (TE) process executable by the processor, the TE process configured to establish a TE topology of a provider network that includes TE information for links between one or more provider edge devices (PEs) and one or more customer edge devices (CEs) (PE-CE links), receive a path request message from a source CE on one of the one or more network interfaces, the path request message requesting a CE-CE Traffic Engineering Label Switched Path (TE-LSP) across the provider network to a destination CE, compute a best path from the source CE to the destination CE based on the TE information for PE-CE links from the CE and PE-CE links to the destination CE, and return the computed best path to the source CE using one of the one or more network interfaces.

20. The apparatus of claim 19, wherein the TE process is further configured to determine a virtual private network (VPN) corresponding to the destination CE, and compute the best path from the source CE to the destination CE based on TE information pertaining to the corresponding VPN.

21. The apparatus of claim 19, wherein the TE process is further configured to return the computed best path to the source CE as one of either a loose hop route, an encrypted route object (ERO), or a path key.

22. The apparatus of claim 19, wherein the TE process is further configured to compute the best path from the source CE to the destination CE based on the TE information, the best path having one or more constraints selected from a group consisting of diversity from other TE-LSPs and load balanced with other TE-LSPs.

23. An apparatus comprising:
one or more network interfaces;
means for establishing a Traffic Engineering (TE) topology of a provider network that includes TE information for links between one or more provider edge devices (PEs) and one or more customer edge devices (CEs) (PE-CE links);
means for receiving a path request message from a source CE, the path request message requesting a CE-CE Traffic Engineering Label Switched Path (TE-LSP) across the provider network to a destination CE;
means for computing a best path from the source CE to the destination CE based on the TE information for PE-CE links from the CE and PE-CE links to the destination CE; and
means for returning the computed best path to the source CE.

* * * * *

UNITED STATES PATENT AND TRADEMARK OFFICE
CERTIFICATE OF CORRECTION

| | | |
|---|---|---|
| PATENT NO. | : 7,710,872 B2 | Page 1 of 1 |
| APPLICATION NO. | : 11/302595 | |
| DATED | : May 4, 2010 | |
| INVENTOR(S) | : Jean-Philippe Vasseur | |

It is certified that error appears in the above-identified patent and that said Letters Patent is hereby corrected as shown below:

Col. 1, Line 21, please amend as shown: should read;

through one or more intermediate nodes, such[[ is]] as routers

Col. 9, Line 46, please amend as shown: should read;

the Internetwork<u>ing</u> Operating System, or IOS™, of Cisco Sys-

Signed and Sealed this

Twenty-eighth Day of September, 2010

David J. Kappos
*Director of the United States Patent and Trademark Office*